United States Patent [19]

Bousquet et al.

[11] Patent Number: 5,573,188

[45] Date of Patent: *Nov. 12, 1996

[54] PROCESS FOR GRINDING CALCIUM CARBONATE IN AQUEOUS MEDIA

[75] Inventors: Hubert Bousquet, Caluire; Georges Ravet, Saint-Genis-Les-Ollières; Jacky Rousset, Saint-Trivier-Sur-Moignans, all of France

[73] Assignee: Coatex S.A., Caluire, France

[ * ] Notice: The portion of the term of this patent subsequent to Jun. 25, 2011, has been disclaimed.

[21] Appl. No.: 348,082

[22] Filed: Nov. 23, 1994

Related U.S. Application Data

[63] Continuation of Ser. No. 942,799, Sep. 10, 1992, abandoned, which is a continuation of Ser. No. 718,930, Jun. 25, 1991, Pat. No. 5,181,662, which is a continuation of Ser. No. 470,897, Jan. 26, 1990, abandoned.

[30] Foreign Application Priority Data

Jan. 27, 1989 [FR] France ..................... 89 01317

[51] Int. Cl.$^6$ ..................... B01J 2/30
[52] U.S. Cl. ............ 241/16; 241/17; 423/DIG. 15; 106/465
[58] Field of Search ............ 241/16, 17; 106/465; 423/DIG. 15

[56] References Cited

U.S. PATENT DOCUMENTS

| | | | |
|---|---|---|---|
| 3,615,811 | 10/1971 | Barrett | 423/430 |
| 3,797,610 | 3/1974 | Windle | 106/306 |
| 3,989,195 | 11/1976 | Falcon-Steward | 106/464 |
| 4,159,312 | 6/1979 | Shibazaki et al. | 423/430 |
| 4,292,318 | 12/1980 | Brahm et al. | 423/430 |
| 4,650,126 | 3/1987 | Fedr et al. | 241/22 |
| 4,840,985 | 6/1989 | Gonnet et al. | 106/465 |
| 4,845,191 | 7/1989 | Hautier et al. | 528/489 |
| 4,868,228 | 9/1989 | Gonnet et al. | 106/465 |
| 4,888,161 | 12/1989 | Adams, Jr. et al. | 423/430 |
| 5,181,662 | 1/1993 | Bousquet et al. | 241/16 |

FOREIGN PATENT DOCUMENTS 949260   5/1968   United Kingdom .

Primary Examiner—Gary P. Straub
Assistant Examiner—Stuart L. Hendrickson
Attorney, Agent, or Firm—Oblon, Spivak, McClelland, Maier & Neustadt, P.C.

[57] ABSTRACT

Ground calcium carbonate is prepared by a process of grinding a suspension containing calcium carbonate to be ground and a water-soluble grinding agent in an aqueous medium while the temperature of the aqueous suspension is kept at below 60° C.

10 Claims, No Drawings

PROCESS FOR GRINDING CALCIUM CARBONATE IN AQUEOUS MEDIA

This application is a continuation of application Ser. No. 07/942,799, filed on Sep. 10, 1992, now abandoned; which is a continuation of Ser. No. 07/718,930, filed on Jun. 25, 1991, now U.S. Pat. No. 5,181,662; which is a continuation of Ser. No. 07/470,897, filed on Jan. 26, 1990, now abandoned.

BACKGROUND OF THE INVENTION

1. Field of the Invention

The present invention relates to a process for grinding calcium carbonate in aqueous media in the presence of a water-soluble grinding agent in a quantity far below that presently used in the art, which nevertheless leads to fine suspensions with a concentration of dry substance of at least 70% by weight and with a particle size of two micrometers at the most.

2. Description of the Background

It is well known that inorganic substances such as calcium carbonate, sulfate, and silicate, as well as titanium dioxide can be used In for the preparation of industrial products which in turn are used in the paint, paper-coating, rubber-extender, synthetic resin and the like fields. However, since these inorganic substances do not have a natural lamellar or laminar structure to facilitate their disintegration, as is the case with certain substances such as the aluminum silicates commonly known by the name of kaolin, one skilled in the art has to transform them by grinding to a fine particle size aqueous suspension whose constituent particles have the smallest possible dimension, i.e., less than several microns, in order to be able to use them in the pigment field.

The number of publications in the specialized literature in this field reveals the importance and complexity of grinding inorganic substances in aqueous media to obtain a partially refined quality that permits application in pigments. This is why it is well known in the particular case of paper coating that coating compositions formed of inorganic pigments such as kaolin, calcium carbonate, calcium sulfate, and titanium dioxide in suspension in water also contains binders and dispersing agents as well as other additives such as thickeners and coloring agents. It is desirable for such coating compositions to have a low and stable viscosity for the duration of the coating operations, to facilitate handling and application of the compositions and at the same time to have a content of inorganic material as high as possible to reduce the amount of heat energy necessary to remove the aqueous fraction of the coating composition by drying. Such an ideal suspension combining all of these fundamental qualities would solve for the person skilled in the art the well-known problems of grinding, storage, transport from the place of production to the place of application, and finally of pumping during its use.

It has been found that the grinding techniques for inorganic substances in aqueous media have led to suspensions that are unstable with time, because of the sedimentation effects of the inorganic substances and the increase of viscosity of the aqueous medium. Therefore, those skilled in the art have become resigned in the processes related to the older techniques of obtaining pigment substances by grinding, to accomplish the grinding of the inorganic substance in aqueous suspension by one or more successive operations, and then to drying and classifying the ground substance while eliminating the insufficiently small particles, and separating the inorganic particles with the desired pigment dimensions to obtain a fine inorganic powder of low water content. Thus, this fine powder, intended for pigment applications, is readily transportable from its place of production to the place of use where it is again placed in suspension in water to be used as a pigment product.

Consequently, the fact that the inorganic pigment cannot be kept in the form of an aqueous suspension between the grinding operations and application has induced those of skill in the art to proceed with research in this field, which has consisted of carrying out the grinding of inorganic substances in aqueous suspension to provide, after grinding, a pigment suspension of low viscosity that is stable with time. Thus, for example, French Patent No. 1 506 724 suggests a process for preparing an aqueous suspension of calcium carbonate by grinding, which is stable with time. The method consists of forming an aqueous suspension by agitation which contains 25 to 50% by weight of calcium carbonate, and then grinding the aqueous material with a suitable grinding substance in the presence of a dispersing agent. This dispersing agent is an acrylic polymer soluble in water that is added to the grinding medium in an amount of 0.2 to 0.4% by weight of the calcium carbonate present. In spite of the undeniable benefit of having an inorganic pigment suspension which exhibits good time stability, it appears that such a suspension has drawbacks that can be considered to be significant by one skilled in the art. This is the case, for example, with the content of dry substance of such a suspension intended for grinding, which necessarily has to be between 25% and 50% by weight, and preferably equal to about 40% by weight, because if the concentration is below 25%, the process described is of little economic interest because of its low productivity, and if the initial concentration of dry substance is above 50%, the efficiency of the grinding process decreases because of the large increase of the viscosity of the medium which becomes an obstacle to the grinding steps, which produces a suspension of coarse sized particles. Thus, when the concentration of dry substance in the suspension intended for grinding is chosen in the range of 25% to 50% by weight, the particle size of the calcium carbonate obtained after a very long period of grinding in the presence of the dispersing agent can be considered to be favorable for pigment applications, since 95% of the particles have a maximum dimension smaller than two microns.

The fact that an aqueous suspension of inorganic substances cannot be ground at a concentration above 50%, because of the great increase of viscosity, has prompted those skilled in the art to find another method. Consequently, processes have been suggested for forming aqueous suspensions of inorganic substances, not including grinding, which have a high content of dry substance. French Patent No. 1 562 326, for example, discloses a process for preparing an aqueous suspension of inorganic substances. The objective of this process is to prepare a highly concentrated aqueous suspension of dry substance that is sufficiently stable so that it can be transported in this form from its point of manufacture to its point of use. The process proposed consists of forming an aqueous suspension of inorganic substances containing from 70 to 85% by weight of dry substance, of which at least 99% by weight of the initial particles have a dimension below or equal to 50 microns, and then of agitating this suspension in the presence of a dispersing agent, which can be a sodium or potassium salt of a polyphosphoric acid, a polyacrylic acid, a polysilicic acid, etc., obtained by complete neutralization of the corresponding acid with sodium or potassium hydroxide. This dispersing agent is then introduced at a level of 0.05% to 0.5% by weight relative to the weight of dry substance contained in the aforesaid suspension. It is stated that the content of dry substance in the suspension should not be above 85% by weight because of the great increase of its viscosity, and cannot be below 70% by weight without causing undesirable sedimentation. However, this technique is not entirely satisfactory.

Another solution to the problem requires grinding, in the presence of a dispersing agent, of an aqueous suspension of calcium carbonate which has too low a concentration of dry substance to be of interest, although it has the advantage of producing a pigment suspension of low viscosity and small particle size, providing up to 95% of particles with sizes below two microns.

Still another solution to the problem requires the preparation of an aqueous suspension with a high content of dry substance, containing 70% to 85% by weight of inorganic substances, 99% of the initial particles of which have a dimension below or equal to 50 microns. A dispersing agent is introduced into the medium that stabilizes these particles.

A number of efforts have been made to make the grinding agents derived from the chemistry of carboxylic acids more effective for obtaining concentrated suspensions of finely divided calcium carbonate. Thus, French Patent Number 2 539 137 describes a grinding agent based on acrylic polymers and/or copolymers whose molecular weight has been properly selected so that it brackets specific viscosities ranging from 0.50–0.60, whose neutralization is accomplished with at least one neutralizing agent containing a monovalent cation and at least one neutralizing agent containing a polyvalent cation.

Moreover, European Patent 0 108 842 proposes an improvement of the grinding agent in which a sulfonated comonomer such as acrylamidopropanesulfonic acid is introduced into the molecule of the carboxylic polymer. However, in all cases the suspensions of calcium carbonate with high concentration and very small particle size are obtained with high energy consumption. This causes a temperature increase of the medium that exceeds 100° C. most of the time, and high consumption of the order of 1% of the grinding agent in the dry state relative to the weight of dry calcium carbonate, when it is desired to obtain more than 60% of particles below 1 micron and a concentration of calcium carbonate greater than 70%. The use of excessively large quantities of grinding agent, which are nevertheless necessary up to now to obtain these fine, concentrated suspensions with acceptable rheology and stability for paper coating applications, has several major drawbacks which include the following:

i) A first drawback is found in the paper industry when "brokes" are recycled, because too high a supply of anionic polyacrylate from recycling causes the at least partial inhibition of the cationic retention agents used and interferes with sheet formation.

ii) Another drawback is found in the fact that these agents which can be found, in part, in waste water impede its clarification and contribute to increasing the chemical oxygen demand (COD) of water, which is unacceptable to water treatment authorities, iii) Still another drawback that arises is the need to protect people against toxic products. That is, paper products containing the conventional inorganic substances, which come into contact with food, must contain limited amounts of such agents, amounts that are not achievable with the present grinding processes and grinding agents.

iv) Finally, the excess grinding agent constitutes a useless waste.

A need therefore continues to exist for an improved method of forming ground pigment suspensions.

SUMMARY OF THE INVENTION

Accordingly, one object of the present invention is to provide an effective means of grinding calcium carbonate in aqueous media which requires reduced levels of grinding agent.

Briefly, this object and other objects of the present invention as hereinafter will become more readily apparent can be attained in a process for grinding calcium carbonate in an aqueous medium in the presence of a water-soluble grinding agent in an amount far below that employed in the prior art, but nevertheless leading to fine particle size suspensions with a dry substance of at least 70% by weight and with a particle size of 2 μm at most such that the aqueous grinding medium containing calcium carbonate to be ground in suspension and a water-soluble grinding agent is kept at a temperature below 60° C.

DETAILED DESCRIPTION OF THE PREFERRED EMBODIMENTS

The cooling of the suspension of calcium carbonate subjected to grinding in the present process can be accomplished by any known means, either by passage of the calcium carbonate suspension through a heat exchanger, or by providing the outside walls of the grinder, or the internal impellers and possible baffles, with a cooling system.

The grinding agent is preferably at least one acidic polymer and/or copolymer obtained from at least one carboxylated ethylenic monomer. Suitable carboxylated ethylenic monomers include acrylic, methacrylic, itaconic, crotonic, fumaric acids, maleic anhydride, or isocrotonic, aconitic, mesaconic, sinapic, undecylenic, angelic, and hydroxyacrylic acids, preferably acrylic and methacrylic acids.

The carboxylated ethylenic monomer can be combined with at least one other ethylenic monomer that does not have carboxyl groups. These other monomers, include acrolein, acrylamide and its substituted derivatives, acrylonitrile, the esters of acrylic and methacrylic acids, and especially the $C_1$ to $C_8$ acrylates and methacrylates, as well as dimethylaminoethyl methacrylate quaternized or unquaternized, imidazoles, vinylpyrrolidone, vinylcaprolactam, ethylene, propylene, isobutylene, diisobutylene, vinyl acetate, styrene and its substituted derivatives, alphamethylstyrene, methyl vinyl ketone, vinyl chloride, hydroxylated monomers, more particularly the acrylates and methacrylates of ethylene glycol, of propylene glycol, and their phosphated, phosphonated, phosphonylated, sulfated, sulfonated, nitrated, and nitrosated derivatives.

These acidic polymers and/or copolymers result from the polymerization and/or copolymerization by known processes in the presence of initiators and suitable regulators, in aqueous, alcoholic, aqueous alcoholic, aromatic, or aliphatic media, or in a halogenated solvent, of at least one acrylic and/or methacrylic acid monomer.

Suitable polymerization media include water, methanol, ethanol, propanol, isopropanol, the butanols, or dimethylformamide, dimethyl sulfoxide, tetrahydrofuran, acetone, methyl ethyl ketone, butyl acetate, hexane, heptane, benzene, toluene, ethylbenzene, xylene, mercaptoethanol, t-dodecyl mercaptan, thioglycolic acid and its esters, n-dodecyl mercaptan, acetic, tartaric, lactic, citric, gluconic, or glucoheptonic acid, 2-mercaptopropionic acid, thiodiethanol, halogenated solvents such as carbon tetrachloride, chloroform, methylene chloride, methyl chloride, monopropylene glycol ethers, and diethylene glycol.

In accordance with a variant that has been found to be of interest, the polymers and/or copolymers of the present invention in aqueous solution can be totally or partially neutralized by a neutralizing agent having a monovalent cation. However, a neutralizing agent with a polyvalent cation can be combined with this monovalent cation containing base.

Suitable monovalent cations include the alkali metal ions and similar cations, particularly lithium, sodium, potassium, ammonium, or amine cations, possibly polysubstituted. In the case of polyvalent cations,. suitable such ions include the alkaline earths, preferably calcium, magnesium, zinc, and aluminum.

The liquid phase resulting from the polymerization and/or copolymerization of monomers which contains the acidic polymer and/or copolymer can be used in this form as a grinding agent for the refining of the calcium carbonate to be refined.

In practice, the grinding operation of the present process is noted by the following features:

a) A suspension of coarse calcium carbonate is prepared with agitation by first introducing all or part of the grinding agent into the aqueous phase, and then the calcium carbonate is introduced to obtain a fluid and preferably homogeneous suspension.

b) The suspension prepared in (a) is introduced continuously into a grinding zone composed of a micro-element grinder.

c) The temperature of the suspension during the grinding is kept at a level below 60° C., preferably below 45° C., very preferably below 30° C.

d) The suspension to be ground is ground in the presence of the micro-elements for the time necessary to obtain the mean particle size desired.

e) An additional fraction of the grinding agent may be introduced during the grinding, at least once.

f) At discharge from the grinder, the suspension of finely ground calcium carbonate is separated continuously from the grinding materials and particles of calcium carbonate which are too coarse are rejected.

The grinding agent of the invention is introduced into the aqueous suspension of calcium carbonate at a level of 0.05 to 1% by weight of active substance relative to the dry weight of coarse calcium carbonate to be ground, and preferably at a level of 0.1 to 0.8%.

The suspension during the grinding and collected at the completion of grinding generally has a concentration of dry substance of at least 70% preferably in the range of 72 to 80% by weight, and a pigment particle size below 2 micrometers, 60% of the particles having a dimension below 1 micrometer.

The aqueous suspension of calcium carbonate of the invention can beneficially be used in the paper field as a filler or coating, and in the formulation of paints. The ground calcium carbonate resulting from such a process can be dried and used as fillers with polymeric substances.

Having generally described this invention, a further understanding can be obtained by reference to certain specific examples which are provided herein for purposes of illustration only and are not intended to be limiting unless otherwise specified.

EXAMPLE 1

This example, which represents a prior art process, describes the preparation of a suspension of coarse calcium carbonate subjected to grinding to refine it into a microparticulate suspension. To this end, a suspension of coarse calcium carbonate was prepared from natural calcium carbonate with an average diameter of 50 micrometers, using a polyacrylic acid with a molecular weight of 4000 as grinding agent, with 70% of its functional groups having been neutralized by sodium ion and 30% by calcium ion. In this example an aqueous suspension of calcium carbonate having a dry solids concentration of 75% by weight is prepared and ground without using a cooling device.

EXAMPLE 2

A second group of Examples (Examples 2-1, 2-2, 2-3, 2-4) describes the preparation and grinding of the same aqueous suspension of calcium carbonate at the same dry solids concentration in the presence of the same mixed sodium/calcium polyacrylate having an average molecular weight of 4000, with the temperature being controlled at 60° C. for Example 2-1, 45° C. for Example 2-2, and 25° C. for Examples 2-3 and 2-4. The individual processes were carried out according to the same experimental criteria, by carrying out the grinding in the same apparatus so that the results obtained can be compared. In each Example, an aqueous suspension of calcium carbonate of the aforesaid origin was prepared, having a particle size below 50 micrometers. The aqueous suspension had a concentration expressed in percent by weight relative to the total composition as indicated in Table 1 below.

The grinding agent was present in a given suspension in the quantities indicated in Table 1 below, expressed as percent by weight relative to the weight of calcium carbonate to be ground. This quantity was adjusted to maintain the viscosity of the suspension between 100 and 500 centipoises during the grinding, measured with a Brookfield viscosimeter at 100 rpm (cup 3). The suspension thus prepared was placed in a grinder of the Dyno-Mill type with fixed cylinder and rotating impeller, whose grinding material was composed of corundum beads with a diameter in the range of 0.6 millimeter to 1.0 millimeter. The total volume occupied by the grinding material was 5 liters, while its weight was 10 kilograms. The grinding chamber had a volume of 5 liters. The tangential velocity of the grinder was 10 meters per second. The suspension of calcium carbonate was recycled at a rate of 50 liters per hour. The discharge part of the Dyno-Mill grinder was equipped with a separator with a mesh of 300 microns, providing for the separation of the grinding material from the suspension resulting from the grinding.

The temperature of the medium of Example 1 was stabilized at 100° C.

The grinding was continued by recycling until a particle size was obtained such that 75% of the particles were smaller than 1 micron.

At the end of the grinding, the viscosity of the microparticulate suspension was measured with a Brookfield viscosimeter at a temperature of 20° C. and with a speed of rotation of 100 rpm (cup No. 3).

In the same way, after the grinding, the particle size distribution was determined with a Laser H R 850 granulometer from the CILAS ALCATEL Company.

The results obtained are shown in Table 1 below.

TABLE 1

| Examples | Dry extract (%) | Percentage of particles smaller than 1 micron | Brookfield viscosity 100 rpm at 20° C. (cP) | Grinding temperature (°C.) | Percentage of grinding agent necessary (%) | Saving of dispersant (− %) |
| --- | --- | --- | --- | --- | --- | --- |
| Example 1 (Prior art) | 75% | 75% | 340 cP | 100° C. | 1.10% | 0 |
| Example 2-1 (Invention) | 75% | 76% | 320 cP | 60° C. | 0.73% | −33% |
| Example 2-2 (Invention) | 75% | 75% | 360 cP | 45° C. | 0.52% | −52% |
| Example 2-3 (Invention) | 75% | 76% | 350 cP | 25° C. | 0.46% | −58% |
| Example 2-4 (Invention) | 77% | 76% | 460 cP | 25° C. | 0.53% | −52% |

From the data above it is clear that controlling the temperature of the grinding operation at a level below 60° C. provides for aqueous suspensions of $CaCO_3$ with the same rheology characteristics, small particle sizes, and concentrations as those obtained at higher temperature but with a large saving of grinding agent that can exceed 50%. Furthermore, this temperature control provides for increasing the concentration of dry substance in the ground suspension, with the aforesaid suspension nevertheless retaining the good characteristics of small particle size and viscosity.

On the other hand, the change of viscosity of the calcium carbonate suspensions obtained by grinding at different temperatures was tested to observe the possible consequences of using less dispersing agent when operating at a good temperature. The results obtained are shown in Table 2 below. It appears that the suspensions of calcium carbonate obtained by grinding at low temperature and containing reduced quantities of dispersing agent show better stability in storage than in the prior art, in spite of everything, which is manifested by a more stable and lower viscosity with time.

Letters Patent of the United States is:

1. In a process for grinding coarse calcium carbonate in the presence of a water-soluble polymeric grinding agent composed of at least one acidic polymer or copolymer obtained from at least one carboxylated ethylenic monomer selected from the group consisting of acrylic acid, methacrylic acid, itaconic acid, crotonic acid, fumaric acid, maleic anhydride, isocrotonic acid, aconitic acid, mesaconic acid, sinapic acid, undecylenic acid, angelic acid, and a-hydroxyacrylic acid to produce an aqueous suspension of at least 75% by weight of calcium carbonate having a particle size no larger than about 2 μm and at least 60% of the particles having a particle size below 1 μm, the improvement which comprises:

maintaining the temperature of the aqueous suspension below 60° C. during the grinding step, wherein the grinding agent is introduced into the aqueous medium at an amount of 0.05% to 0.73% by weight relative to the dry weight of calcium carbonate.

2. The grinding process of claim 1, wherein the grinding medium is kept between 45°–60° C.

3. The grinding process of claim 1, wherein the suspension of calcium carbonate has a concentration in percent by weight ranging from 75 to 80%.

TABLE 2

| Examples | Immediate viscosity | Viscosity after 24 H | | Viscosity after 8 hours | |
| --- | --- | --- | --- | --- | --- |
| | | AVAG (*) | APAG (**) | AVAG (*) | APAG (**) |
| Example 1 100° C. (Prior art) | 340 cP | 950 cP | 340 cP | 1,600 cP | 550 cP |
| Example 2-1 60° C. (Invention) | 320 cP | 950 cP | 340 cP | 1,200 cP | 410 cP |
| Example 2-2 45° C. (Invention) | 360 cP | 870 cP | 350 cP | 1,200 cP | 330 cP |
| Example 2-3 30° C. (Invention) | 350 cP | 750 cP | 330 cP | 950 cP | 290 cP |
| Example 3-3 25° C. (Invention) | 460 cP | 860 cP | 430 cP | 1,100 cP | 430 cP |

(*) AVAG: Viscosity measured on the suspension left at rest and before agitation.
(**) APAG: Viscosity measured on the suspension that has previously been agitated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by

4. The grinding process of claim 1, wherein the carboxylated ethylenic monomer is acrylic acid or methacrylic acid.

5. The grinding process of claim 1, wherein the carboxylated ethylenic monomer contains at least one other ethylenic monomer selected from the group consisting of acrolein, acrylamide, methylol acrylamide, methacrylamide, acrylonitrile, the $C_1$ to $C_8$ esters of acrylic and methacrylic acids, dimethylaminoethyl acrylate, quaternized dimethylaminoethyl acrylate, the imidazoles, vinylpyrrolidone, vinylcaprolactam, ethylene, propylene, isobutylene, diisobutylene, vinyl acetate, styrene, alpha-methylstyrene, methyl vinyl ketone, vinyl chloride, the acrylates and methacrylates of ethylene glycol, of propylene glycol, and their phosphated, phosphonated, phosphonylated, sulfated, sulfonated, nitrated, and nitrosated derivatives.

6. The grinding process of claim 1, wherein the grinding agent is at least partly neutralized by a pH neutralizing agent having a monovalent cation.

7. The grinding process of claim 6, wherein the neutralizing agent is a base containing a cation selected from the group consisting of the alkali metals and ammonium ion.

8. The grinding process of claim 7, wherein the alkali metal is lithium, sodium or potassium.

9. The grinding process of claim 1, wherein the neutralizing agent contains both a monovalent cation and a polyvalent cation.

10. The grinding process of claim 9, wherein the polyvalent cation is selected from the group consisting of calcium, magnesium, zinc and aluminum.

* * * * *

UNITED STATES PATENT AND TRADEMARK OFFICE
CERTIFICATE OF CORRECTION

PATENT NO. : 5,573,188
DATED : November 12, 1996
INVENTOR(S) : Hubert BOUSQUET, et al.

It is certified that error appears in the above-indentified patent and that said Letters Patent is hereby corrected as shown below:

On the title page, Item [*], the Terminal Disclaimer information should read:

-- [*] The term of this patent shall not extend beyond the expiration date of Patent No. 5,181,662. --

Signed and Sealed this

First Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,573,188
DATED : NOVEMBER 12, 1996
INVENTOR(S) : HUBERT BOUSQUET, ET AL.

It is certified that error appears in the above-identified patent and that said Letters Patent is hereby corrected as shown below:

Column 1,  line 24, "used In for the"

should read, --used in the--.

Column 5,  line 17, "cations,. suitable"

should read --cations, suitable--.

Column 8,  lines 28-29, "and a-hydroxyacrylic"

should read --and α-hydroxyacrylic--.

Signed and Sealed this

Twenty-eighth Day of April, 1998

Attest:

BRUCE LEHMAN

*Attesting Officer*       *Commissioner of Patents and Trademarks*